Aug. 28, 1956
B. H. TONGUE
2,761,135
MULTI-SIGNAL ELECTRIC SYSTEM
Filed July 26, 1952
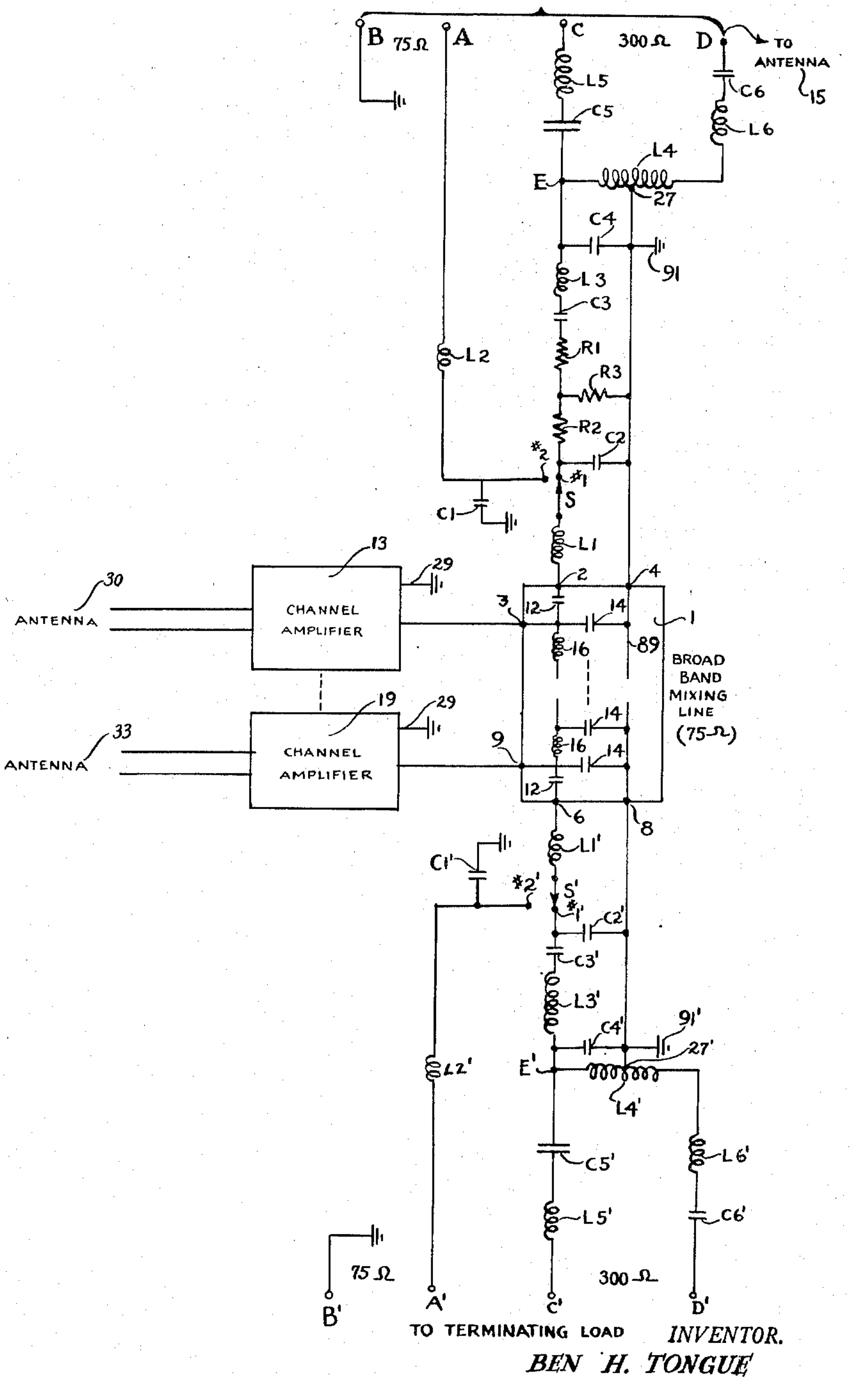
INVENTOR.
BEN H. TONGUE
BY Rines and Rines
ATTORNEYS

2,761,135

MULTI-SIGNAL ELECTRIC SYSTEM

Ben H. Tongue, Mount Vernon, N. Y.

Application July 26, 1952, Serial No. 301,083

12 Claims. (Cl. 343—200)

The present invention relates to electric systems and more particularly to electric systems in which a plurality of different signals may simultaneously be supported.

It has heretofore been proposed to feed a plurality of different signals, such as different-frequency television channel programs, by way of a plurality of amplifiers to successive intermediate points along a distribution transmission line. This process is commonly termed "mixing" the signals, and the amplifier-transmission line system is often referred to as a "mixer," where the terms "mixing" and "mixer" do not here mean conventional non-linear beating or heterodyning, but, rather, merely the simultaneous and independent feeding of the signals to a common line where the signals maintain their identity and may be fed to a utilization circuit such as a television receiver or distribution system. In such systems, however, channel amplifier units may be wasted since some channel frequencies may be of sufficient signal strength as not to require amplification. Strong and weak signals fed into the mixer line through similar amplifier units, moreover, will have markedly different signal strengths in the mixer line, resulting in better television reception and display for one channel than for another.

An object of the present invention is to provide a new and improved multi-signal electric system of this character in which amplifiers need not be used for a strong channel signal, and yet the signal of such a channel is rendered of signal strength in the mixer line comparable with the amplified signal-strength of amplified weaker channel signals.

Other and further objects will be explained hereinafter and will be particularly pointed out in the appended claims. Though the invention will hereinafter be described in connection with the application of the present invention to television signals, it is to be understood that the invention is equally useful with other types of signals and frequency ranges.

In summary, the invention relates to an electric system having a mixer transmission line provided at one end with a first set of input terminals, at the other end with a set of output terminals and at a point intermediate its ends with at least a second set of input terminals. An antenna may be directly connected to the first set of input terminals for feeding thereto strong signals of a first channel frequency, and weaker signals of a second channel frequency may be fed, after amplification, to the second set of input terminals. The distributed inductance and capacitance elements of the mixer line couple the first and second sets of input terminals together so that the signal-impedance presented at the first set of input terminals may alter the signal-impedance presented at the second set of input terminals, thereby to control the amplitude of the second signal fed into the mixer line. An isolation circuit is connected between the said antenna and the first set of input terminals, preferably a T-type resistor-attenuator network, and of parameters such as to present at the first set of input terminals a predetermined impedance substantially independent of the impedance of the said antenna, in order to determine the amplitude of the second channel-frequency signal fed into the mixer line substantially independently of the impedance of the said antenna. Preferred constructional details are hereinafter set forth.

The invention will now be described in connection with the accompanying drawing the single figure of which is a schematic circuit diagram of the invention in preferred form.

A broad-band mixing line, preferably of artificial construction, comprising successive sections of inductance-capacitance elements, is shown at 1, into intermediate points or terminals 3 and 9 of which different channel-frequency signals are fed from appropriate channel-frequency antennas 30 and 33, through appropriate corresponding channel amplifiers 13 and 19. These channel-frequency signals may be of sufficiently weak signal strength at the antennas 30 and 33 to require amplification before mixing in the mixer line 1. While only two antennas 30 and 33 and corresponding channel amplifiers 13 and 19 are shown, as are only two intermediate feed points or terminals 3 and 9, this is only for illustrative purposes, it being understood that but a single amplifier channel may be used, or, similarly, more than two channels may be utilized, as indicated by the dotted lines between the channel amplifiers and the terminal sections of the line 1. The terminal sections of the mixer line 1 are shown of the low-pass type having series inductors 16 and shunt capacitors 14, broadly resonant so as to accept and support all of the channel frequencies within, for example, the television bands. The points 3 and 9, and the grounds 29 constitute two sets of input terminals intermediate the upper and lower ends or terminals 2, 4 and 6, 8 of the mixer line 1. The intermediate input terminals 3 and 9 connect to the left-hand side of the line between series inductors 16 and series capacitances 12 and the ground intermediate input terminals 29 connect to the right-hand side 89 of the line through the ground connection 91. Though the mixer line 1 is shown in the drawing as vertically oriented, and reference has been made to upper and lower ends or terminals and to left- and right-hand sides, this is only for purposes of explanation since the line may be oriented in any desired position.

There are thus present in the mixer line 1, the channel frequencies fed from the antennas 30 and 33 through amplifier units 13 . . . 19. In the event that a strong channel-frequency signal is available, as is often the case in practical television installations, in accordance with the present invention, that strong signal may be directly fed from an antenna into the line 1 without wasting an amplifier unit and without creating a great discrepancy between the different channel-frequency signal strengths in the mixer line 1. One of the ends of the line 1, shown as the upper end, is used to receive this strong signal. The strong channel-frequency antenna is illustrated at 15, connected to input terminals C and D, which, in turn, through networks hereinafter described, connect to the upper end terminals 2 and 4 of the line 1. A 75-ohm coaxial transmission line input is also available at the terminals A and B. The antenna 15, like the antennas 30 and 33, may be connected by, for example, a coaxial or parallel-wire transmission line to the system. It may be connected, as an illustration, by a 300-ohm parallel-wire line to input terminals C and D. In the case of the 300-ohm-line connection to the input terminals C and D, there is connected therefrom a pair of balanced push-pull series filter-network arms comprising respective inductances L5 and L6 and series-connected capacitances C5 and C6. The capacitance C5 is connected to the inductance L6 through a 300-ohm impedance matching transformer L4 the center tap 27 of which is grounded at 91, and a capacitance C4 shunts the half of the transformer L4 from point E, adjacent the capacitance C5, to the grounded center tap 27. A single-ended unbalanced filter network, comprising the series-connected inductance L3 and condenser C3 and the further series inductance L1 and shunt-connected capacitance C2, is connected between the upper terminals 2 and 4 of the line 1 when a switch S is disposed in the #1 position, as shown. When the switch S is disposed in position #2, on the other hand, the 75-ohm-line connection at terminals A and B is effected through series inductance L2, shunt capacitance C1 and series inductance L1 to the upper terminals 2 and 4 of the line 1. The line 1, moreover, in the above instances, has a characteristic impedance of about 75 ohms.

The purpose of the before-described circuit elements between the input terminals A and B or C and D and the upper input terminals 2 and 4 of the line 1 will now be explained. In the case where the switch S is disposed in position #2, a 75-ohm load is presented at the input terminals A and B. Inductances L1 and L2 are adjusted in connection with capacitance C1, which pads the capacitance of the switch S, to act as a further section of the artificial line 1, thus presenting a 75-ohm impedance match at the terminals 2 and 4 of the 75-ohm line 1, and acting as a band-pass filter section for feeding the desired channel frequency to the terminals 2 and 4. When the switch S is disposed in position #1, as illustrated, there is presented at the terminals C and D, on the other hand, a 300-ohm load. Inductance L1 forms a further filter section acting as an extension of the artificial line 1 in conjunction with shunt capacitance C2. The values of the inductance L5 and the capacitance C5 and of the inductance L6 and the capacitance C6 of the push-pull series filter network arms are adjusted to resonate with the leakage inductance of the matching transformer L4 at a frequency corresponding approximately to the geometric mean of the frequency limits of the television band; for example, to the geometric mean of 54 and 216 megacycles. Resonance to this same frequency is also established by adjusting the values of the inductance L3 and capacitance C3. Similarly, the value of the shunt capacitance C4 is adjusted to resonate at this frequency in conjunction with one-quarter of the inductance of the matching transformer L4 and its associated distributed capacitance. In addition to this tuning, however, the ratios of inductance-to-capacitance of the filter network arms formed by the elements L5, C5; L6, C6 and leakage inductance of L4; C4 and ¼ L4 with its distributed capacitance; and L3, C3; are adjusted to give the minimum average reflection coefficient over the desired band, thereby to provide a substantially uniform 300-ohm match. As an illustration, such adjustment has, in practice, been found possible over the said 54 to 216 megacycle band with a maximum reflection coefficient of the order of 0.1. It is further desirable to adjust the push-pull series arms L5, C5, L6, C6 to provide the maximum balance-to-unbalance ratio, since the 300-ohm balanced system at terminals C and D is converted by the matching transformer L4 into a single-ended system between point E and ground 91. This is effected by adjusting the previously discussed ratio of inductance-to-capacitance of the arm L5, C5, and of the arm L6, C6 in conjunction with the distributed inductance of the transformer L4, to present substantially the same impedance over the frequency band between points C and E as between points D and E.

As a result of these adjustments, the composite filter network between terminals C and D and terminals 2 and 4 not only presents a substantially flat response over the complete television frequency band, but also it presents a substantially uniform 300-ohm impedance match over the band consistent with a high rejection of unbalanced energy.

The same type of composite filter network may be connected to the output terminals 6 and 8 of the line 1, the elements of which have been given the same letters and numerals as above discussed, though supplemented with a prime notation. To the ultimate output terminals $A^1$, $B^1$ or $C^1$, $D^1$ will be connected a 75-ohm or 300-ohm line feeding, for example, to a television receiver, or to a distribution system for energizing a plurality of television receivers.

Not only are weak signals from different channels thus simultaneously fed into intermediate input terminals of the mixer line 1 through channel amplifiers 13 . . . 19, but also a strong signal is fed from the antenna 15 directly into the upper end input terminals 2, 4. While the discussion has proceeded upon the assumption that the antenna 15 presented, for example, a 300-ohm impedance match at the terminals C and D, the present invention is also useful with antennas 15 that do not present any such impedance match. The channel frequency of strong signal strength, indeed, may be received by a broad band antenna 15 or other system that may terminate the 300-ohm line connected from the terminals C, D to the antenna 15 in an entirely improper impedance at different frequencies within the band. While the resulting attenuation of the strong signal may be tolerated, this would have a detrimental effect upon the other signals being fed into the mixer line 1 from the channel amplifiers. The signal-impedance appearing at the output terminals of the channel amplifier 13, for example, and thus the signal-impedance appearing at the intermediate input terminals 3, 29—91 of the line 1, should be 37.5 ohms if the line 1 is properly terminated at its upper and lower ends. With the mis-match caused by the antenna 15 of improper impedance, however, the impedance at the upper end input terminals 2, 4 of the line 1 might appear very low. In view of the electric coupling effected by the elements making up the line 1 between the end input terminals 2, 4 and the intermediate input terminals 3, 29—91, the signal-impedance at the intermediate input terminals 3, 29—91 will thus be markedly varied, and the amplitude of the signal fed from antenna 30 through the channel amplifier 13 into the mixer line 1 will be greatly reduced. Such loss of the weak channel-frequency signal strengths, however, cannot be tolerated. In accordance with a further feature of the invention, therefore, an isolation circuit, preferably a T-type resistor-attenuator network, may be inserted between the antenna 15 and the input terminals 2, 4. It is quite convenient to effect this insertion between the antenna terminals C, D and the upper-end input terminals 2, 4 of the line 1. Series resistors R1 and R2 and a shunt resistor R3 are thus shown inserted between the capacitance C3 and the switch terminal #1, being thus connected between the single-ended filter-network circuit elements C4, L3, C3 and L1, C2. With sufficient attenuation and isolation provided by the elements R1, R2 and R3, clearly, the effect of the impedance variation above the attenuator at terminals C and D may be substantially isolated from the terminals 2, 4 below the attenuator so that the desired predetermined impedance of about 75-ohms may be presented at the terminals 2, 4 substantially independently of the impedance variation caused by a mis-matched antenna 15 or the like. The signals fed into the intermediate input terminals 3, 29—91 . . . 9, 29—91, from the channel amplifiers 13 . . . 19, therefore, will always be presented with substantially the correct impedance termination at the upper-end input terminals 2, 4 of the line 1 and their signal amplitudes will be substantially independent of the impedance of the source of signal energy at the terminals C, D.

If too great an attenuation is provided, however, while this may very well serve the purpose of permitting the independent feeding of the weak signals into the mixer line 1 through the channel amplifiers, the signal strength of the strong signal fed into the terminals C, D may be too greatly reduced. A compromise must thus be effected between isolating the effect of the impedance at the terminals C, D from the output circuits of the channel amplifiers, and providing just sufficient attenuation of the strong signal fed into the line at the terminals 2, 4 so that all the signals in the line are of the same order of signal strength. It has been found, in the above illustration, that a value of the series resistors R1 and R2 of about 39 ohms, plus or minus about 10%, and a value of the shunt resistor R3 of about 47 ohms, plus or minus about 10%, provides a satisfactory compromise for the television band from 54 to 216 megacycles, with about a ten-and-one-half decibel isolation. The maximum impedance variation that the line 1 then presents over the band, looking from the channel amplifier output circuits toward the terminals 2, 4, can then be about 18% below 75 ohms for a resultant impedance of zero, and about 20% above 75 ohms for a resultant impedance of infinity.

Modifications will occur to those skilled in the art and all such are considered to fall within the spirit and scope of the invention as defined in the appended claims.

What is claimed is:

1. An electric system having, in combination, a broad-band radio-frequency artificial transmission-line circuit comprising a plurality of successively connected filter sections broadly resonant to a predetermined band of radio frequencies and provided at one end with a first set of input terminals, at the other end with a set of output terminals and at a point intermediate its ends between a pair of adjacent filter sections with a second set of input terminals, an amplifier connected to the second set of input terminals for feeding thereto a signal of a predetermined radio frequency within the said band, an antenna connected to the first set of input terminals for feeding thereto a further signal of a different predetermined radio frequency within the said band, the broadly resonant filter-section portion of the transmission-line-circuit between the first and second sets of input terminals coupling the first and second sets of input terminals electrically so that the signal-impedance presented by the said antenna at the first set of input terminals alters the signal-impedance presented to the said amplifier at the second set of input terminals, thereby affecting the amplitude of the said signal that may be fed into the artificial transmission-line circuit from the said amplifier, and an attenuator network connected between the said antenna and the said first set of input terminals having parameters such as to present at the said second set of input terminals a predetermined impedance substantially independent of the impedance of the said antenna in order to determine the amplitude of the said signal fed into the artificial transmission-line circuit from the said amplifier substantially independently of the impedance of the said antenna.

2. An electric system having, in combination, a broad-band radio-frequency artificial transmission-line circuit comprising a plurality of successively connected filter sections broadly resonant to a predetermined band of radio frequencies and provided at one end with a first set of input terminals, at the other end with a set of output terminals and at a point intermediate its ends between a pair of adjacent filter sections with a second set of input terminals, an amplifier connected to the second set of input terminals for feeding thereto a signal of a predetermined radio frequency within the said band, an antenna for feeding a further signal of a different predetermined radio frequency within the said band, a further broadly resonant filter circuit tuned to pass the said band connecting the antenna to the first set of input terminals, the broadly resonant filter-section portion of the artificial transmission-line-circuit between the first and second sets of input terminals coupling the first and second sets of input terminals electrically so that the signal-impedance presented by the said antenna at the first set of input terminals alters the signal-impedance presented to the said amplifier at the second set of input terminals, thereby affecting the amplitude of the said signal that may be fed into the artificial transmission-line circuit from the said amplifier, and an attentuator network connected intermediate the said further broadly resonant filter circuit between the said antenna and the said first set of input terminals having parameters such as to present at the said second set of input terminals a predetermined impedance substantially independent of the impedance of the said antenna in order to determine the amplitude of the said signal fed from the said amplifier into the artificial transmission-line circuit substantially independently of the impedance of the said antenna.

3. An electric system having, in combination, a broad-band radio-frequency artificial transmission-line circuit comprising a plurality of successively connected filter sections broadly resonant to a predetermined band of radio frequencies and provided at one end with a first set of input terminals, at the other end with a set of output terminals and at a point intermediate its ends between a pair of adjacent filter sections with a second set of input terminals, an amplifier connected to the second set of input terminals for feeding thereto a signal of a predetermined radio frequency within the said band, an antenna for feeding a further signal of a different predetermined radio frequency within the said band, a pair of broadly resonant balanced push-pull series filter-network arms interconnected by a matching transformer, means for connecting the antenna to the said pair of arms, a single-ended unbalanced broadly resonant filter network connected between one end of the matching transformer and an intermediate point thereof, means for connecting the said single-ended network to the first set of input terminals, the broadly resonant filter-section portion of the artificial transmission-line-circuit between the first and second sets of input terminals coupling the first and second sets of input terminals electrically so that the signal-impedance presented by the said antenna at the first set of input terminals alters the signal-impedance presented to the said amplifier at the second set of input terminals, thereby affecting the amplitude of the said signal that may be fed into the artificial transmission-line circuit from the said amplifier, and an attenuator network connected to the single-ended filter network between the said antenna and the said first set of input terminals having parameters such as to present at the said second set of input terminals a predetermined impedance substantially independent of the impedance of the said antenna in order to determine the amplitude of the said signal fed from the said amplifier into the artificial transmission-line circuit substantially independently of the impedance of the said antenna.

4. An electric system having, in combination, a broad-band radio-frequency artificial transmission-line circuit comprising a plurality of successively connected filter sections broadly resonant to a predetermined band of radio frequencies and provided at one end with a first set of input terminals, at the other end with a set of output terminals and at a point intermediate its ends between a pair of adjacent filter sections with a second set of input terminals, an amplifier connected to the second set of input terminals for feeding thereto a signal of a predetermined radio frequency within the said band, an antenna for feeding a further signal of a different predetermined radio frequency within the said band, a pair of broadly resonant balanced push-pull series filter-network arms comprising series-connected inductance and capacitance interconnected by a matching transformer, means for connecting the antenna to the said pair of arms, a single-ended unbalanced broadly resonant filter network comprising inductance, series and shunt capacitance connected between one end of the matching transformer and an intermediate point thereof, means for connecting the said single-ended network to the first set of input terminals, the series-connected inductance and capacitance of the said pair of push-pull filter-network arms and the inductance and series and shunt capacitance of the said single-ended filter network each being adjusted to resonate, in conjunction with the said matching transformer, at substantially the geometric mean of approximately the frequency limits of the said band, and the ratio of the inductance to capacitance of the series-connected inductance and capacitance of the said pair of push-pull filter-network arms being adjusted to present substantially the same impedance over the said band between each connection of the said antenna to the said pair of push-pull filter-network arms and the said one end of the matching transformer, thereby to maximize the balance-to-unbalance ratio of the connection of the said pair of arms to the said single-ended network, the broadly resonant filter section portion of the artificial transmission-line-circuit between the first and second sets of input terminals coupling the first and second sets of input terminals electrically so that the signal-impedance presented by the said antenna at the first set of input terminals alters the signal-impedance presented to the said amplifier at the second set of input terminals, thereby affecting the amplitude of the said signal that may be fed into the artificial transmission-line circuit from the said amplifier, and an attenuator network connected to the said single-ended network between the said antenna and the said first set of input terminals having parameters such as to present at the said second set of input terminals a predetermined impedance substantially independent of the impedance of the said antenna in order to determine the amplitude of the said signal fed from the said amplifier into the artificial transmission-line circuit substantially independently of the impedance of the said antenna.

5. An electric system as claimed in claim 4 and in which the antenna presents an impedance of approximately 300 ohms, the artificial transmission-line circuit has a characteristic impedance of approximately 75 ohms and the attenuator network comprises a T-type resistor network the series arms of which have a value of about 39 ohms, plus or minus 10%, and the shunt arm, a value of about 47 ohms, plus or minus 10%.

6. An electric system as claimed in claim 1 and in which the artificial transmission-line circuit has a characteristic impedance of approximately 75 ohms and the attenuator network comprises a T-type resistor network the series arms of which have a value of about 39 ohms, plus or minus 10%, and the shunt arm, a value of about 47 ohms, plus or minus 10%.

7. An electric system having, in combination, an antenna for receiving a predetermined radio-frequency signal, a pair of balanced push-pull series filter-network arms comprising series-connected inductance and capacitance interconnected by a matching transformer and broadly resonant to a predetermined band of radio frequencies including the frequency of the said radio-frequency signal, means for connecting the antenna to the said pair of arms, a single-ended unbalanced filter network comprising inductance and series and shunt capacitance connected between one end of the matching transformer and an intermediate point thereof, means for connecting the said single-ended network to a load, the series-connected inductance and capacitance of the said pair of push-pull filter-network arms and the inductance and series and shunt capacitance of the said single-ended filter network each being adjusted to resonate, in conjunction with the said matching transformer, at substantially the geometric means of approximately the frequency limits of the said band, and the ratio of the inductance to capacitance of the series-connected inductance and capacitance of the said pair of push-pull filter-network arms being adjusted to present substantially the same impedance over the said band between each connection of the said antenna to the said pair of push-pull filter-network arms and the said one end of the matching transformer, thereby to maximize the balance-to-unbalance ratio of the connection of the said pair of arms to the said single-ended network.

8. An electric system as claimed in claim 7 and in which a T-type resistor attenuator network is inserted between the said inductance and series capacitance of the said single-ended filter network and the said shunt capacitance and further inductance thereof.

9. An electric system as claimed in claim 8 and in which the impedance of the said load is approximately 75 ohms and the series arms of the said T-type resistor attenuator network have a value of about 39 ohms, plus or minus 10%, and the shunt arm, a value of about 47 ohms, plus or minus 10%.

10. An electric system having, in combination, an artificial transmission line broadly resonant to a predetermined band of radio frequencies, and provided with a first set of input terminals at one end and a set of output terminals at the other end, a second set of input terminals disposed at a point along the transmission line intermediate its ends, a filter broadly resonant to the said predetermined band of radio frequencies and connected at one end to the first set of input terminals, means for connecting to the other end of the filter an antenna adapted to receive a first and relatively strong radio-frequency signal within the said predetermined band of frequencies, means for connecting to the second set of input terminals a radio-frequency amplifier system adapted to receive and amplify a second and relatively weak radio-frequency signal within the said predetermined band of radio frequencies, and an isolation circuit connected intermediate the ends of the filter between adjacent circuit elements thereof and having parameters of sufficient value to isolate the impedance presented by the said antenna to the said one end of the filter from the said first set of input terminals of the line, in order that the signal amplitude of the second radio-frequency signal fed from the radio-frequency amplifier system to the second set of input terminals of the line will be rendered substantially independent of the impedance of the said antenna, but the parameters of the isolation circuit having only sufficient value to attenuate the relatively strong first radio-frequency signal to a signal amplitude comparable with the signal amplitude of the second amplified radio-frequency signal fed to the second set of input terminals of the line, in order that the signal amplitudes of the first and second radio-frequency signals appearing at the output terminals of the line may be of the same order of magnitude.

11. An electric system having, in combination, an artificial transmission line provided with a first set of input terminals at one end and a set of output terminals at the other end, the artificial transmission line comprising a plurality of successively connected filter sections broadly resonant to accept a predetermined band of radio frequencies, a second set of input terminals disposed at a point along the artificial transmission line intermediate its ends and between a pair of adjacent filter sections of the line, a further broadly resonant filter connected at one end to the first set of input terminals, means for connecting to the other end of the further filter an antenna adapted to receive a first and relatively strong radio-frequency signal within the said predetermined band of radio frequencies, means for connecting to the second set of input terminals a radio-frequency amplifier system adapted to receive and amplify a second and relatively weak radio-frequency signal within the said predetermined band of radio frequencies, and an isolation circuit connected intermediate the ends of the further filter between adjacent circuit elements thereof and having parameters of sufficient value to isolate the impedance presented by the said antenna to the said one end of the further filter from the said first set of input terminals of the line, in order that the signal amplitude of the second radio-frequency signal fed from the radio-frequency amplifier system to the second set of input terminals of the line will be rendered substantially independent of the impedance of the said antenna, but the parameters of the isolation circuit having only sufficient value to attenuate the relatively strong first radio-frequency signal to a signal amplitude comparable with the signal amplitude of the second amplified radio-frequency signal fed to the second set of input terminals of the line, in order that the signal amplitudes of the first and second radio-frequency signals appearing at the output terminals of the line may be of the same order of magnitude.

12. An electric system having, in combination, an artificial transmission line provided with a first set of input terminals at one end and a set of output terminals at the other end, the artificial transmission line comprising a plurality of successively connected filter sections broadly resonant to accept a predetermined band of radio frequencies, a second set of input terminals disposed at a point along the artificial transmission line intermediate its ends and between a pair of adjacent filter sections of the line, a further broadly resonant filter comprising a pair of balanced push-pull series filter-network arms interconnected by a matching transformer and a single-ended unbalanced filter network connected between one side of the matching transformer and an intermediate point thereof, means for connecting the single-ended unbalanced filter network of the further filter to the first set of input terminals, means for connecting the push-pull series filter-network arms of the further filter to an antenna adapted to receive a first and relatively strong radio-frequency signal within the said predetermined band of radio frequencies, means for connecting to the second set of input terminals a radio-frequency amplifier system adapted to receive and amplify a second and relatively weak radio-frequency signal within the said predetermined band of radio frequencies, and an isolation circuit connected intermediate the ends of the further filter between adjacent circuit elements of the single-ended unbalanced filter network thereof and having parameters of sufficient value to isolate the impedance presented by the said antenna from the said first set of input terminals of the line, in order that the signal amplitude of the second radio-frequency signal fed from the radio-frequency amplifier system to the second set of input terminals of the line will be rendered substantially independent of the impedance of the said antenna, but the parameters of the isolation circuit having only sufficient value to attenuate the relatively strong first radio-frequency signal to a signal amplitude camparable with the signal amplitude of the second amplified radio-frequency signal fed to the second set of input terminals of the line, in order that the signal amplitudes of the first and second radio-frequency signals appearing at the output terminals of the line may be of the same order of magnitude.

References Cited in the file of this patent

UNITED STATES PATENTS

| | | |
|---|---|---|
| 1,677,956 | Dean | July 24, 1928 |
| 1,937,796 | Smith et al. | Dec. 5, 1933 |
| 2,151,081 | Carlson et al. | Mar. 21, 1939 |
| 2,229,044 | Butler | Jan. 21, 1941 |
| 2,394,917 | Kallmann | Feb. 12, 1946 |
| 2,523,173 | Winters | Sept. 19, 1950 |
| 2,611,086 | Amy et al. | Sept. 19, 1952 |